US012247182B2

(12) United States Patent
Vinson et al.

(10) Patent No.: US 12,247,182 B2
(45) **Date of Patent: *Mar. 11, 2025**

(54) ALKYLBENZENESULFONATE SURFACTANTS

(71) Applicant: The Procter & Gamble Company, Cincinnati, OH (US)

(72) Inventors: Phillip Kyle Vinson, Fairfield, OH (US); Randall Thomas Reilman, Cincinnati, OH (US); Patrick Christopher Stenger, Fairfield, OH (US); Cheyne Thomas, Independence, KY (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/535,201

(22) Filed: Dec. 11, 2023

(65) Prior Publication Data

US 2024/0199980 A1 Jun. 20, 2024

Related U.S. Application Data

(63) Continuation of application No. 17/101,307, filed on Nov. 23, 2020, now Pat. No. 11,879,110.

(60) Provisional application No. 62/940,932, filed on Nov. 27, 2019.

(51) Int. Cl.

| | |
|---|---|
| ***C11D 1/22*** | (2006.01) |
| ***C11D 1/29*** | (2006.01) |
| ***C11D 1/37*** | (2006.01) |
| ***C11D 1/75*** | (2006.01) |
| ***C11D 1/83*** | (2006.01) |
| ***C11D 17/00*** | (2006.01) |
| ***C11D 17/04*** | (2006.01) |

(52) U.S. Cl.

CPC .................. *C11D 1/22* (2013.01); *C11D 1/29* (2013.01); *C11D 17/0008* (2013.01); *C11D 17/043* (2013.01); *C11D 2111/12* (2024.01)

(58) Field of Classification Search

None

See application file for complete search history.

(56) References Cited

U.S. PATENT DOCUMENTS

| | | | | |
|---|---|---|---|---|
| 4,368,147 | A | 1/1983 | Inamorato et al. | |
| 4,619,774 | A | 10/1986 | Ramachandran et al. | |
| 4,842,767 | A | 6/1989 | Warschewski et al. | |
| 5,221,495 | A | 6/1993 | Cao | |
| 6,730,650 | B1 | 5/2004 | Wood | |
| 11,879,110 | B2 * | 1/2024 | Vinson | C11D 17/0008 |
| 2002/0082182 | A1 | 6/2002 | Kott et al. | |
| 2006/0115440 | A1 | 6/2006 | Arata et al. | |
| 2006/0281658 | A1 | 12/2006 | Kellar et al. | |
| 2007/0241306 | A1 | 10/2007 | Wehner et al. | |
| 2007/0270324 | A1 | 11/2007 | Bastigkeit et al. | |
| 2008/0051309 | A1 | 2/2008 | Lin et al. | |
| 2012/0214724 | A1 | 8/2012 | Scheibel et al. | |
| 2017/0233683 | A1 | 8/2017 | Everaert et al. | |
| 2018/0320109 | A1 | 11/2018 | Boutique et al. | |
| 2019/0218170 | A1 | 7/2019 | Clendennen et al. | |
| 2021/0155871 | A1 | 5/2021 | Vinson et al. | |

FOREIGN PATENT DOCUMENTS

| | | | |
|---|---|---|---|
| EP | 0487169 | A1 | 5/1992 |
| JP | S63397 | A | 1/1988 |
| JP | S63132997 | A | 6/1988 |
| JP | H01112593 | A | 5/1989 |
| JP | 2004530022 | A | 9/2004 |
| JP | 2012007155 | A | 1/2012 |
| JP | 2015124337 | A | 7/2015 |
| JP | 2017534730 | A | 11/2017 |

OTHER PUBLICATIONS

PCT Search Report and Written Opinion for PCT/US2020/061793 dated Mar. 2, 2021, 14 pages.
All Office Actions; U.S. Appl. No. 17/101,307, filed Nov. 23, 2020.

* cited by examiner

*Primary Examiner* — Lorna M Douyon
(74) *Attorney, Agent, or Firm* — Andrew J. Mueller

(57) ABSTRACT

A liquid laundry composition having from about 6% to about 50%, by weight of the laundry composition, of a surfactant component. The surfactant component having from about 0.5% to about 30%, by weight of the laundry composition, of an HLAS surfactant selected from alkyl benzene sulfonic acids, alkali metal or amine salts of C10-16 alkyl benzene sulfonic acids, wherein the HLAS surfactant comprises greater than 50% C12.

19 Claims, No Drawings

ALKYLBENZENESULFONATE SURFACTANTS

FIELD OF THE INVENTION

The present invention relates to improved detergent and cleaning products containing particular types of alkylarylsulfonate surfactants. More particularly, these alkylarylsulfonates have chemical compositions which differ both from the highly branched nonbiodegradable or "hard" alkylbenzenesulfonates still commercially available in certain countries; and which differ also in chainlength distribution from the so-called linear alkylbenzenesulfonates which have replaced them in most geographies. Moreover the selected surfactants are formulated into new detergent compositions by combination with particular detergent adjuncts. The compositions are useful for cleaning a wide variety of substrates.

BACKGROUND OF THE INVENTION

Historically, highly branched alkylbenzenesulfonate surfactants, such as those based on tetrapropylene (known as "ABS") were used in detergents. However, these were found to be very poorly biodegradable. A long period followed of improving manufacturing processes for alkylbenzenesulfonates, making them as linear as practically possible ("LAS"). An overwhelming part of linear alkylbenzenesulfonate surfactant manufacture is directed to this objective. All relevant large-scale commercial alkylbenzenesulfonate processes in use today are directed to linear alkylbenzenesulfonates. However, linear alkylbenzenesulfonates are not without limitations; for example, they would be more desirable if specific chainlength distributions enabled better performance and freshness delivery, thereby improving utilization efficiency on a carbon basis.

As a result of the limitations of the alkylbenzenesulfonates, consumer cleaning formulations have often needed to include a higher level of the alkylbenzenesulfonate, cosurfactants, builders, and other additives than would have been needed given a superior alkylbenzenesulfonate.

Accordingly it would be very desirable to simplify detergent formulations and deliver both better performance and better value to the consumer. Moreover, in view of the very large tonnages of alkylbenzenesulfonate surfactants and detergent formulations used worldwide, even modest improvements in performance of the basic alkylbenzenesulfonate detergent could carry great weight.

SUMMARY OF THE INVENTION

It is an aspect herein to provide improved detergent compositions comprising certain sulfonated alkylbenzenes. It is another aspect to provide the improved surfactants and surfactant mixtures comprising the same. These and other aspects of the present invention will be apparent from the description hereinafter.

The present invention has numerous advantages beyond satisfying one or more of the aspects identified hereinabove, including but not limited to: superior performance in detergency, for example for cold water or normal temperature laundering; superior freshness delivery; rheology modification; and improved carbon efficiency than corresponding linear alkyl benzene sulfonates with conventional chainlength distributions. Further, the invention is expected to provide reduced build-up of old fabric softener residues from fabrics being laundered, and improved removal of lipid or greasy soils from fabrics. Benefits are expected also in non-laundry cleaning applications, such as dish cleaning.

The present invention is based on an unexpected discovery that there exist, in the middle ground between the old, highly branched, nonbiodegradable alkylbenzenesulfonates and the new linear types, certain alkylbenzenesulfonates which are both more highly performing than the latter and more biodegradable than the former.

The cleaning composition will comprise about 6% to about 50%, by weight of the composition, of a surfactant component, preferably from about 15% to about 35% by weight of the composition, of a surfactant component comprising: a) from about 0.5% to about 30%, by weight of the laundry composition, of an HLAS surfactant selected from alkyl benzene sulfonic acids, alkali metal or amine salts of C10-16 alkyl benzene sulfonic acids, wherein the HLAS surfactant comprises greater than 50% C12, preferably greater than 60%, preferably greater than 70% C12, more preferably greater than 75%, and b) a second surfactant Accordingly, it is an aspect of the present invention to provide novel cleaning compositions. These, and other, aspects, features and advantages will be clear from the following detailed description and the appended claims.

All percentages, ratios and proportions herein are by weight, unless otherwise specified. All temperatures are in degrees Celsius (o C) unless otherwise specified. All documents cited are in relevant part, incorporated herein by reference.

DETAILED DESCRIPTION OF THE INVENTION

The present invention relates to novel surfactant compositions. It also relates to novel cleaning compositions containing the novel surfactant system.

Alkylarylsulfonate Surfactant System

The present invention is directed to an alkylarylsulfonate surfactant system containing a specific chain length distribution.

Cleaning Compositions

The surfactant compositions of the present invention can be used in a wide range of consumer cleaning product compositions including powders, liquids, granules, gels, pastes, tablets, pouches, bars, types delivered in dual-compartment containers, spray or foam detergents and other homogeneous or multiphasic consumer cleaning product forms. They can be used or applied by hand and/or can be applied in unitary or freely alterable dosage, or by automatic dispensing means, or are useful in appliances such as washing-machines or can be used in institutional cleaning contexts. Both high-foaming and low-foaming detergent types are encompassed.

Consumer product cleaning compositions are described in the "Surfactant Science Series", Marcel Dekker, New York, Volumes 1-67 and higher. Liquid compositions in particular are described in detail in the Volume 67, "Liquid Detergents", Ed. Kuo-Yann Lai, 1997, ISBN 0-8247-9391-9 incorporated herein by reference.

Consumer product cleaning compositions herein nonlimitingly include:

Heavy Duty Liquid Detergents (HDL): these compositions include both the so-called "structured" or multi-phase (see for example, U.S. Pat. No. 5,160,655) and "non-structured" or isotropic liquid types and can in general be aqueous or nonaqueous (see, for example, U.S. Pat. No. 5,102,574; and can be with bleach (see for example, U.S.

Pat. No. 5,445,756) and/or enzymes (see for example, U.S. Pat. No. 5,442,100) or without bleach and/or enzymes. Other patents relating to heavy-duty liquid detergents are tabulated or listed in Surfactant Science Series, Vol. 67, pages 309-324.

The cleaning composition may be in the form of a unitized dose article, such as a tablet, a pouch, a sheet, or a fibrous article. Such pouches typically include a water-soluble film, such as a polyvinyl alcohol water-soluble film, that at least partially encapsulates a composition. Suitable films are available from MonoSol, LLC (Indiana, USA). The composition can be encapsulated in a single or multi-compartment pouch. A multi-compartment pouch may have at least two, at least three, or at least four compartments. A multi-compartmented pouch may include compartments that are side-by-side and/or superposed. The composition contained in the pouch or compartments thereof may be liquid, solid (such as powders), or combinations thereof. Pouched compositions may have relatively low amounts of water, for example less than about 20%, or less than about 15%, or less than about 12%, or less than about 10%, or less than about 8%, by weight of the detergent composition, of water.

Heavy Duty Granular Detergents (HDG): these compositions include both the so-called "compact" or agglomerated or otherwise non-spray-dried, as well as the so-called "fluffy" or spray-dried types. Included are both phosphated and nonphosphated types. Such detergents can include the more common anionic-surfactant based types or can be the so-called "high-nonionic surfactant" types in which commonly the nonionic surfactant is held in or on an absorbent such as zeolites or other porous inorganic salts. Manufacture of HDG's is, for example, disclosed in U.S. Pat. No. 5,576,285.

"Softergents" (STW): these compositions include the various granular or liquid (see for example, U.S. Pat. No. 5,017,296) softening-through-the wash types of product and in general can have organic (e.g., quaternary) or inorganic (e.g., clay) softeners.

Special Purpose Cleaners (SPC) including home dry cleaning systems (see for example, U.S. Pat. No. 5,547,476); bleach pretreatment products for laundry; fabric care pretreatment products (see for example EP 752,469 A); liquid fine fabric detergent types, especially the high-foaming variety; rinse-aids for dishwashing; liquid bleaches including both chlorine type and oxygen bleach type, and disinfecting agents, mouthwashes, denture cleaners, car or carpet cleaners or shampoos, hair rinses, shower gels, foam baths and personal care cleaners and metal cleaners; as well as cleaning auxiliaries such as bleach additives and "stain-stick" or other pre-treat types including special foam type cleaners and anti-sunfade treatments are also encompassed.

Laundry or Cleaning Adjunct Materials and Methods:

In general, a laundry or cleaning adjunct is any material required to transform a composition containing only the minimum essential ingredients into a composition useful for laundry or cleaning purposes. Adjuncts in general include stabilizers, diluents, structuring materials, agents having aesthetic effect such as colorants, pro-perfumes and perfumes, and materials having an independent or dependent cleaning function. In preferred embodiments, laundry or cleaning adjuncts are easily recognizable to those of skill in the art as being absolutely characteristic of laundry or cleaning products, especially of laundry or cleaning products intended for direct use by a consumer in a domestic environment.

While not essential for the purposes of the present invention as most broadly defined, several such conventional adjuncts illustrated hereinafter are suitable for use in the instant laundry and cleaning compositions and may be desirably incorporated in preferred embodiments of the invention, for example to assist or enhance cleaning performance, for treatment of the substrate to be cleaned, or to modify the aesthetics of the detergent composition as is the case with perfumes, colorants, dyes or the like. The precise nature of these additional components, and levels of incorporation thereof, will depend on the physical form of the composition and the nature of the cleaning operation for which it is to be used.

Preferably, the adjunct ingredients if used with bleach should have good stability therewith. Certain preferred detergent compositions herein should be boron-free and/or phosphate-free as required by legislation. Levels of adjuncts are from about 0.00001% to about 99.9%, typically from about 70% to about 95%, by weight of the compositions. Use levels of the overall compositions can vary widely depending on the intended application, ranging for example from a few ppm in solution to so-called "direct application" of the neat cleaning composition to the surface to be cleaned.

Common adjuncts include builders, surfactants, enzymes, polymers, bleaches, bleach activators, catalytic materials and the like excluding any materials already defined hereinabove as part of the essential component of the inventive compositions. Other adjuncts herein can include diverse active ingredients or specialized materials such as dispersant polymers (e.g., from BASF Corp. or Rohm & Haas), color speckles, silvercare, anti-tarnish and/or anti-corrosion agents, dyes, fillers, germicides, alkalinity sources, hydrotropes, anti-oxidants, enzyme stabilizing agents, pro-perfumes, perfumes, solubilizing agents, carriers, processing aids, pigments, and, for liquid formulations, solvents, as described in detail hereinafter.

Quite typically, laundry or cleaning compositions herein such as laundry detergents, laundry detergent additives, hard surface cleaners, synthetic and soap-based laundry bars, fabric softeners and fabric treatment liquids, solids and treatment articles of all kinds will require several adjuncts, though certain simply formulated products, such as bleach additives, may require only, for example, a oxygen bleaching agent and a surfactant as described herein.

Detersive surfactants—The instant compositions desirably include a detersive surfactant. Detersive surfactants are extensively illustrated in U.S. Pat. No. 3,929,678, Dec. 30, 1975 Laughlin, et al, and U.S. Pat. No. 4,259,217, Mar. 31, 1981, Murphy; in the series "Surfactant Science", Marcel Dekker, Inc., New York and Basel; in "Handbook of Surfactants", M. R. Porter, Chapman and Hall, 2nd Ed., 1994; in "Surfactants in Consumer Products", Ed. J. Falbe, Springer-Verlag, 1987; and in numerous detergent-related patents assigned to Procter & Gamble and other detergent and consumer product manufacturers.

The detersive surfactant herein therefore includes anionic, nonionic, zwitterionic or amphoteric types of surfactant known for use as cleaning agents in textile laundering, but does not include completely foam-free or completely insoluble surfactants (though these may be used as optional adjuncts). Examples of the type of surfactant considered optional for the present purposes are relatively uncommon as compared with cleaning surfactants but include, for example, the common fabric softener materials such as dioctadecyldimethylammonium chloride.

In more detail, detersive surfactants useful herein, typically at levels from about 1% to about 55%, by weight, suitably include: (1) conventional alkylbenzenesulfonates; (2) olefin sulfonates, including α-olefin sulfonates and sulfonates derived from fatty acids and fatty esters; (3) alkyl or alkenyl sulfosuccinates, including the diester and half-ester types as well as sulfosuccinamates and other sulfonate/carboxylate surfactant types such as the sulfosuccinates derived from ethoxylated alcohols and alkanolamides; (4) paraffin or alkane sulfonate- and alkyl or alkenyl carboxysulfonate-types including the product of adding bisulfite to alpha olefins; (5) alkylnaphthalenesulfonates; (6) alkyl isethionates and alkoxypropanesulfonates, as well as fatty isethionate esters, fatty esters of ethoxylated isethionate and other ester sulfonates such as the ester of 3-hydroxypropanesulfonate or AVANEL S types; (7) benzene, cumene, toluene, xylene, and naphthalene sulfonates, useful especially for their hydrotroping properties; (8) alkyl ether sulfonates; (9) alkyl amide sulfonates; (10) α-sulfo fatty acid salts or esters and internal sulfo fatty acid esters; (11) alkylglycerylsulfonates; (12) ligninsulfonates; (13) petroleum sulfonates, sometimes known as heavy alkylate sulfonates; (14) diphenyl oxide disulfonates; (15) linear or branched alkylsulfates or alkenyl sulfates; (16) alkyl or alkylphenol alkoxylate sulfates and the corresponding polyalkoxylates, sometimes known as alkyl ether sulfates, as well as the alkenylalkoxysulfates or alkenylpolyalkoxy sulfates; (17) alkyl amide sulfates or alkenyl amide sulfates, including sulfated alkanolamides and their alkoxylates and polyalkoxylates; (18) sulfated oils, sulfated alkylglycerides, sulfated alkylpolyglycosides or sulfated sugar-derived surfactants; (19) alkyl alkoxycarboxylates and alkylpolyalkoxycarboxylates, including galacturonic acid salts; (20) alkyl ester carboxylates and alkenyl ester carboxylates; (21) alkyl or alkenyl carboxylates, especially conventional soaps and α,$\overline{\omega}$-dicarboxylates, including also the alkyl- and alkenylsuccinates; (22) alkyl or alkenyl amide alkoxy- and polyalkoxy-carboxylates; (23) alkyl and alkenyl amidocarboxylate surfactant types, including the sarcosinates, taurides, glycinates, aminopropionates and iminopropionates; (24) amide soaps, sometimes referred to as fatty acid cyanamides; (25) alkylpolyaminocarboxylates; (26) phosphorus-based surfactants, including alkyl or alkenyl phosphate esters, alkyl ether phosphates including their alkoxylated derivatives, phopshatidic acid salts, alkyl phosphonic acid salts, alkyl di(polyoxyalkylene alkanol) phosphates, amphoteric phosphates such as lecithins; and phosphate/carboxylate, phosphate/sulfate and phosphate/sulfonate types; (27) Pluronic- and Tetronic-type nonionic surfactants; (28) the so-called EO/PO Block polymers, including the diblock and triblock EPE and PEP types; (29) fatty acid polyglycol esters; (30) capped and non-capped alkyl or alkylphenol ethoxylates, propoxylates and butoxylates including fatty alcohol polyethyleneglycol ethers; (31) fatty alcohols, especially where useful as viscosity-modifying surfactants or present as unreacted components of other surfactants; (32) N-alkyl polyhydroxy fatty acid amides, especially the alkyl N-alkylglucamides; (33) nonionic surfactants derived from mono- or polysaccharides or sorbitan, especially the alkylpolyglycosides, as well as sucrose fatty acid esters; (34) ethylene glycol-, propylene glycol-, glycerol- and polyglyceryl-esters and their alkoxylates, especially glycerol ethers and the fatty acid/glycerol monoesters and diesters; (35) aldobionamide surfactants; (36) alkyl succinimide nonionic surfactant types; (37) acetylenic alcohol surfactants, such as the SURFYNOLS; (38) alkanolamide surfactants and their alkoxylated derivatives including fatty acid alkanolamides and fatty acid alkanolamide polyglycol ethers; (39) alkylpyrrolidones; (40) alkyl amine oxides, including alkoxylated or polyalkoxylated amine oxides and amine oxides derived from sugars; (41) alkyl phosphine oxides; (42) sulfoxide surfactants; (43) amphoteric sulfonates, especially sulfobetaines; (44) betaine-type amphoterics, including aminocarboxylate-derived types; (45) amphoteric sulfates such as the alkyl ammonio polyethoxysulfates; (46) fatty and petroleum-derived alkylamines and amine salts; (47) alkylimidazolines; (48) alkylamidoamines and their alkoxylate and polyalkoxylate derivatives; and (49) conventional cationic surfactants, including water-soluble alkyltrimethylammonium salts. Moreover, more unusual surfactant types are included, such as: (50) alkylamidoamine oxides, carboxylates and quaternary salts; (51) sugar-derived surfactants modeled after any of the hereinabove-referenced more conventional nonsugar types; (52) fluorosurfactants; (53) biosurfactants; (54) organosilicon surfactants; (55) gemini surfactants, other than the above-referenced diphenyl oxide disulfonates, including those derived from glucose; (56) polymeric surfactants including amphopolycarboxyglycinates; and (57) bolaform surfactants.

Regarding the conventional alkyl benzene sulfonates noted before, especially for substantially linear types including those made using AlCl3 or HF or detal or detal plus or REY alkylation, suitable chainlengths are from about C10 to about C16. Such linear alkyl benzene sulfonate surfactants can be present in the instant compositions.

It has been surprisingly found that, unlike using hydrophobe chain lengths that are typically in a general range of C8-C20 there are significant unexpected benefits when utilizing a chain with greater than 50% of C12, such as, for example, greater than 70% C12, greater than 75% C12, or between 60% C12 and 99% C12. Specifically, it has been surprisingly found that detergents utilizing HLAS surfactants selected from alkyl benzene sulfonic acids, alkali metal salts of C10-16 alkyl benzene sulfonic acids, and more preferably of C10 to C14 alkyl benzene sulfonic acids, wherein the HLAS surfactant comprises greater than 50% C12 have improved stain and freshness results when compared to other carbon distributions. The HLAS surfactant is preferably selected from linear alkyl benzene sulfonates and mixtures thereof.

Additionally, it has been surprisingly found that detergents utilizing HLAS surfactants selected from alkyl benzene sulfonic acids, alkali metal salts of C10-16 alkyl benzene sulfonic acids, wherein the HLAS surfactant comprises a ratio of even carbons to odd carbons of 3:2 to 99:1 have improved stain and freshness results when compared to other carbon distributions.

The compositions of the present disclosure may include from about 1% to about 30%, or from about 5% to about 25%, or from about 7% to about 20% by weight of the composition, of HLAS. The surfactant systems of the present disclosure may include from about 30% to about 75% or from about 40% to about 60%, by weight of the surfactant system, of LAS.

The AES and LAS of the present disclosure may be present in a weight ratio. The composition may include, by weight, more LAS than AES. The LAS and the AES may be present in a weight ratio of from about 1:1 to about 10:1, or from about 1.2:1 to about 5:1, or from about 1.5:1 to about 3:1.

Preferred among the above-identified detersive surfactants are: acid, sodium, potassium, magnesium, ammonium, monoisopropanolamine, monoethanolamine, triethanolamine, methyldiethanolamine, dimethylethanolamine, C9-C20 linear alkylbenzenesulfonates, particularly sodium linear secondary alkyl C10-C15 benzenesulfonates; olefin-sulfonate salts, that is, material made by reacting olefins, particularly C10-C20 α-olefins, with sulfur trioxide and then neutralizing and hydrolyzing the reaction product; sodium and ammonium C7-C12 dialkyl sulfosuccinates; alkane monosulfonates, such as those derived by reacting C8-C20 α-olefins with sodium bisulfite and those derived by reacting paraffins with SO2 and Cl2 and then hydrolyzing with a base to form a random sulfonate; α-Sulfo fatty acid salts or esters; sodium alkylglycerylsulfonates, especially those ethers of the higher alcohols derived from tallow or palm kernel oil or coconut oil and synthetic alcohols derived from petroleum; coal or natural gas, alkyl or alkenyl sulfates, which may be primary or secondary, saturated or unsaturated, branched or unbranched. Nonlimiting examples of suitable synthetic alcohol sources include Neodol®, Lial®, Isalchem®, Safol®, Lutensol®, Alfol®, Tergitol®, Isofol®, and the similar materials available under alternative tradenames. Such compounds when branched can be random-branched or regular-branched, i.e., in a specific position along the hydrocarbon chain. When unsaturated, sulfates such as oleyl sulfate are preferred, while the sodium and ammonium alkyl sulfates, especially those produced by sulfating C8-C18 alcohols, produced for example from tallow or coconut oil are also useful; also preferred are the alkyl or alkenyl ether sulfates, especially the ethoxy sulphates having about 0.5 moles or higher of ethoxylation, preferably from 0.5-8; the alkylethercarboxylates, especially the EO 1-5 ethoxycarboxylates; soaps or fatty acids, preferably the more water-soluble types; aminoacid-type surfactants, such as sarcosinates, especially oleyl sarcosinate; phosphate esters, propoxylates and butoxylates, especially the ethoxylates "AE", including the so-called narrow peaked alkyl ethoxylates and C6-C12 alkyl phenol alkoxylates as well as the products of aliphatic primary or secondary linear or branched C8-C18 alcohols with ethylene oxide, generally 2-30 EO; N-alkyl polyhydroxy fatty acid amides especially the C12-C18 N-methylglucamides, see WO 9206154, and N-alkoxy polyhydroxy fatty acid amides, such as C10-C18 N-(3-methoxypropyl) glucamide while N-propyl through N-hexyl C12-C18 glucamides can be used for low sudsing; alkyl polyglycosides; amine oxides, preferably alkyldimethylamine N-oxides and their dihydrates; sulfobetaines or "sultaines"; betaines; rhamnolipids, sophorolipids, and gemini surfactants.

Suitable levels of anionic detersive surfactants herein are in the range from about 1% to about 50% or higher, preferably from about 2% to about 30%, more preferably still, from about 5% to about 20% by weight of the detergent composition.

Suitable levels of nonionic detersive surfactant herein are from about 0% to about 40% or up to 40%, preferably from about 2% to about 30%, more preferably from about 5% to about 20%.

Nonionic surfactants useful herein include, C12-C18 alkyl ethoxylates ("AE") including the so-called narrow peaked alkyl ethoxylates and C6-C12 alkyl phenol alkoxylates (especially ethoxylates and mixed ethoxy/propoxy), block alkylene oxide condensate of C6-C12 alkyl phenols, alkylene oxide condensates of C8-C22 alkanols and ethylene oxide/propylene oxide block polymers (Pluronic*-BASF Corp.), Other suitable nonionic surfactants include alkoxylated alkyl phenols, alkyl phenol condensates, mid-chain branched alcohols, mid-chain branhed alkyl alkoxylates, alkylpolysaccharides (e.g., alkylpolyglycosides), ether capped poly(oxyalkylated) alcohol surfactants, and mixtures thereof. The alkoxylate units may be ethyleneoxy units, propyleneoxy units, or mixtures thereof. The nonionic surfactants may be linear, branched (e.g., mid-chain branched), or a combination thereof.

An extensive disclosure of these types of surfactants is found in U.S. Pat. No. 3,929,678, Laughlin et al., issued Dec. 30, 1975.

Nonionic surfactants useful herein include those of the formula R1(OC2H4)nOH, wherein R1 is a C10 C16 alkyl group or a C8 C12 alkyl phenyl group, and n is from 3 to about 80. In some embodiments, the nonionic surfactants may be condensation products of C12 C15 alcohols with from about 5 to about 20 moles of ethylene oxide per mole of alcohol, e.g., C12 C13 alcohol condensed with about 6.5 moles of ethylene oxide per mole of alcohol.

Specific nonionic surfactants may include alcohols having an average of from about 12 to about 16 carbons, and an average of from about 3 to about 9 ethoxy groups, such as C12-C14 EO7, C12-C14 EO9, C14-C15 EO7 and C12-C15 EO7 nonionic surfactant.

The detergent compositions herein comprise from 10% to about 50%, by weight of the surfactant system, of nonionic surfactant. In one embodiment, the detergent compositions comprise from about 15% to about 45%, alternatively, between 20% and 40%, by weight of the surfactant system, of nonionic surfactant. The compositions of the present disclosure may include from about 2% to about 20%, or from about 3% to about 16%, by weight of the composition, of nonionic surfactant.

Additional suitable nonionic surfactants include polyhydroxy fatty acid amides of the formula:

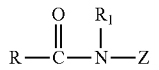

wherein R is a C9-17 alkyl or alkenyl, R1 is a methyl group and Z is glycidyl derived from a reduced sugar or alkoxylated derivative thereof. Examples are N-methyl N-1-deoxyglucityl cocoamide and N-methyl N-1-deoxyglucityl oleamide. Processes for making polyhydroxy fatty acid amides are known and can be found in Wilson, U.S. Pat. No. 2,965,576 and Schwartz, U.S. Pat. No. 2,703,798.

Other useful nonionic surfactants are methyl ester ethoxylates, alkyl polyglycosides, and glycerol monoethers.

Desirable weight ratios of anionic:nonionic surfactants in combination include from 1.0:9.0 to 1.0:0.25, preferably 1.0:1.5 to 1.0:0.25.

Suitable levels of cationic detersive surfactant herein are from about 0.0% to about 15%, preferably from about 1% to about 15%.

Amphoteric or zwitterionic detersive surfactants when present are usually useful at levels in the range from about 0.0% to about 20% by weight of the detergent composition. Often levels will be limited to about 5% or less, especially when the amphoteric is costly.

The surfactant system may comprise alkyl ethoxylated sulfate surfactant (AES). The AES may include an alkyl portion, an ethoxylated portion, and a sulfate head group. The AES may be formed by providing an alcohol feedstock, such as an ethoxylated alcohol feedstock, and sulfating the alcohol. The alcohol and/or AES surfactant of the present disclosure may include mixtures of feedstocks from more than one source, for example two or more sources.

The AES surfactant may include a distribution of AES molecules having alkyl portions in a variety of lengths. Typically, the alkyl portion may range in length from 8 to 20 carbons, or from 10 to 18 carbons, or from 12 to 15 carbons, or from 12 to 16 carbons.

The AES of the present disclosure may include relatively long alkyl portions, making the AES molecules relatively hydrophobic. The alkyl portion of the AES may be linear or branched.

The alkyl portion of the AES may include, on average, from 13.7 to about 16, or from about 13.9 to about 14.6, carbon atoms. At least about 50%, or at least about 60%, of the AES molecules may include an alkyl portion having 14 or more carbon atoms, preferably from 14 to 18, or from 14 to 17, or from 14 to 16, or from 14 to 15 carbon atoms.

The AES of the present disclosure may be characterized by an average degree of ethoxylation. The AES may have an average degree of ethoxylation of from about 1.5 to about 3, or from about 1.8 to about 2.5.

The compositions of the present disclosure may include from about 2% to about 10%, or from about 4% to about 10%, or from about 6% to about 8%, by weight of the composition, of AES. The surfactant systems of the present disclosure may include from up to 30% or from about 5% to about 25%, or from about 15% to about 28%, by weight of the surfactant system, of AES.

Suitable AES according to the present disclosure may be synthesized from feedstocks having a suitable hydrophobe, such as alkyl alcohol feedstocks. The feedstocks may be natural and/or synthetic feedstocks. The feedstocks may be linear, branched, or combinations thereof. The feedstocks may be derived from vegetable oils such as coconut and palm kernel. The feedstocks may be branched alcohols, for example 2-alkyl branched alcohols (as hydrophobes) that have branching, e.g., 100% branching, at the C2 position (C1 is the carbon atom that is or will be covalently attached to the alkoxylated sulfate moiety). 2-alkyl branched alcohols, e.g., 2-alkyl-1-alkanols or 2-alkyl primary alcohols, which may be derived from the oxo process, are commercially available from Sasol, e.g., LIAL® and/or ISALCHEM® (which is prepared from LIAL® alcohols by a fractionation process), and/or from Shell, e.g. Neodols® (which may be prepared via a modified oxo process). The branched alcohols may be mid chain branched with one or more C1-C4 alkyl moieties branched on the longer linear chain, or branched alcohols with a methyl branch randomly distributed along the hydrophobe chain. In some examples, the branched alcohols may contain cyclic moieties. Feedstocks, such as alkyl alcohols, may be ethoxylated and/or sulfonated according to known methods.

The surfactant system may comprise alkyl sulfate surfactant (AS). The AS may include an alkyl portion and a sulfate head group. The AS may be formed by providing an alcohol feedstock and sulfating the alcohol. The alkyl sulfate surfactant of the present disclosure may include mixtures of feedstocks from more than one source, for example two or more sources.

The AS surfactant may include a distribution of AS molecules having alkyl portions in a variety of lengths. Typically, the alkyl portion may range in length from 8 to 20 carbons, or from 10 to 18 carbons, or from 12 to 15 carbons, or from 12 to 16 carbons, or 12 to 14 carbons.

The AS of the present disclosure may include relatively long alkyl portions, making the AS molecules relatively hydrophobic. The alkyl portion of the AS may be linear or branched.

The compositions of the present disclosure may include from about 2% to about 20%, or from about 4% to about 15%, or from about 6% to about 12%, by weight of the composition, of AS. The surfactant systems of the present disclosure may include from up to 40% or from about 5% to about 35%, or from about 10% to about 30%, by weight of the surfactant system, of AS. The AS and HLAS of the present disclosure may be present in a weight ratio. The HLAS and the AS may be present in a weight ratio of from about 0.5:1 to about 5:1, or from about 0.7:1 to about 2:1, or from about 0.9:1 to about 1.5:1.

Suitable AS according to the present disclosure may be synthesized from feedstocks having a suitable hydrophobe, such as alkyl alcohol feedstocks. The feedstocks may be natural and/or synthetic feedstocks. The feedstocks may be linear, branched, or combinations thereof. The feedstocks may be derived from vegetable oils such as coconut and palm kernel. The feedstocks may be branched alcohols, for example 2-alkyl branched alcohols (as hydrophobes) that have branching, e.g., 100% branching, at the C2 position (C1 is the carbon atom that is or will be covalently attached to the alkoxylated sulfate moiety). 2-alkyl branched alcohols, e.g., 2-alkyl-1-alkanols or 2-alkyl primary alcohols, which may be derived from the oxo process, are commercially available from Sasol, e.g., LIAL® and/or ISALCHEM® (which is prepared from LIAL® alcohols by a fractionation process), and/or ISOFOL®, and/or from Shell, e.g. Neodols® (which may be prepared via a modified oxo process). Other branched alcohols may be mid chain branched with one or more C1-C4 alkyl moieties branched on the longer linear chain, or branched alcohols with a methyl branch randomly distributed along the hydrophobe chain. In some examples, the branched alcohols may contain cyclic moieties. Feedstocks, such as alkyl alcohols, may be sulfonated according to known methods.

The second surfactant of the present disclosure may be selected from anionic surfactants, nonionic surfactants, amphoteric surfactants, amine oxide, other cationic surfactants, and mixtures thereof Enzyme System The cleaning compositions of the present disclosure comprise an enzyme system. The enzyme system may be present in the detergent composition at a level of from about 0.0001% to about 5%, or from about 0.001% to about 2%, by weight of the cleaning composition. The enzyme system may comprise one or more cellulase enzymes at level of from about 0.0001% to about 0.1%, or from about 0.002% to about 0.075%, or from about 0.005% to about 0.05% by weight of the cleaning composition. It has been surprisingly found that the combination of a low level cellulase enzyme in combination with the polyester copolymer (hereafter "copolymer") of the present invention can protect clothing from particulate dye transfer, particularly indigo. Furthermore, combining the cellulase with the polyester can protect garments dyed with particulate dyes from fading.

The enzyme system comprises a plurality of enzymes. The enzymes may be provided individually, or they may be provided as a combination, such as in a premix that contains a plurality of enzymes.

The enzyme system contains cellulase enzymes. The system may further additionally comprise one or more cellulase enzymes. The enzyme system may comprise one or more cellulase enzymes each at a level of from 0.0001% to 2%, or from about 0.001% to about 1%, or from about 0.002% to about 0.1%, or from about 0.005% to about 0.05% pure enzyme by weight of the total composition selected from the group consisting of a xyloglucanase enzyme and any mutations thereof and an endoglucanase (endolase) enzyme and any mutations thereof.

Cellulases

The consumer products can comprise cellulases of bacterial or fungal origin. Chemically modified or protein engineered mutants are included. Suitable cellulases include cellulases from the genera Bacillus, Pseudomonas, Humicola, Fusarium, Thielavia, Acremonium, e.g., the fungal cellulases produced from Humicola insolens, Myceliophthora thermophila and Fusarium oxysporum disclosed in U.S. Pat. Nos. 4,435,307, 5,648,263, 5,691,178, 5,776,757 and 5,691,178. Suitable cellulases include the alkaline or neutral cellulases having colour care benefits. Commercially available cellulases include CELLUZYME®, CAREZYME® and CAREZYME PREMIUM (Novozymes A/S), CLAZINASE®, and PURADAX HA® (Genencor International Inc.), and KAC-500(B)® (Kao Corporation).

The bacterial cleaning cellulase may be a glycosyl hydrolase having enzymatic activity towards amorphous cellulose substrates, wherein the glycosyl hydrolase is selected from GH families 5, 7, 12, 16, 44 or 74. Suitable glycosyl hydrolases may also be selected from the group consisting of: GH family 44 glycosyl hydrolases from Paenibacillus polyxyma (wild-type) such as XYG1006 described in U.S. Pat. No. 7,361,736 or are variants thereof. GH family 5 glycosyl hydrolases from Bacillus agaradhaerens (wild type) or variants thereof; GH family 5 glycosyl hydrolases from Paenibacillus (wild type) such as XYG1034 and XYG 1022 described in U.S. Pat. No. 6,630,340 or variants thereof; GH family 74 glycosyl hydrolases from *Jonesia* sp. (wild type) such as XYG1020 described in WO 2002/077242 or variants thereof; and GH family 74 glycosyl hydrolases from Trichoderma Reesei (wild type), such as the enzyme described in more detail in Sequence ID NO. 2 of U.S. Pat. No. 7,172,891, or variants thereof. Suitable bacterial cleaning cellulases are sold under the tradenames Celluclean® and Whitezyme® (Novozymes A/S, Bagsvaerd, Denmark).

In one aspect, the composition may comprise a fungal cleaning cellulase belonging to glycosyl hydrolase family 45 having a molecular weight of from 17 kDa to 30 kDa, for example the endoglucanases sold under the tradename Biotouch® NCD, DCC, DCL and FLX1 (AB Enzymes, Darmstadt, Germany). Additionally, preferred cellulases include the ones covered in WO2016066896.

The enzyme system can comprise other enzymes. Suitable enzymes provide cleaning performance and/or fabric care benefits. Examples of other suitable enzymes include, but are not limited to, hemicellulases, peroxidases, proteases, amylase, other cellulases, pectate lyases, xylanases, lipases, phospholipases, esterases, cutinases, pectinases, keratanases, reductases, oxidases, phenoloxidases, lipoxygenases, ligninases, pullulanases, tannases, pentosanases, malanases, nucleases, ß-glucanases, arabinosidases, hyaluronidase, chondroitinase, laccase, and known amylases, or combinations thereof. A preferred enzyme system further comprises a cocktail of conventional detersive enzymes such as protease, lipase, cutinase and/or cellulase in conjunction with amylase. Detersive enzymes are described in greater detail in U.S. Pat. No. 6,579,839.

Enzyme Stabilizing System

The compositions may optionally comprise from about 0.001% to about 10%, or from about 0.005% to about 8%, or from about 0.01% to about 6%, by weight of the composition, of an enzyme stabilizing system. The enzyme stabilizing system can be any stabilizing system which is compatible with the detersive enzyme. Such a system may be inherently provided by other formulation actives, or be added separately, e.g., by the formulator or by a manufacturer of detergent-ready enzymes. Such stabilizing systems can, for example, comprise calcium ion, boric acid, propylene glycol, diethylene glycol, 2-methyl-1,3-propane diol, glycerol, sorbitol, calcium formate, short chain carboxylic acids, boronic acids, chlorine bleach scavengers and mixtures thereof, and are designed to address different stabilization problems depending on the type and physical form of the detergent composition. In the case of aqueous detergent compositions comprising protease, a reversible protease inhibitor, such as a boron compound, including borate, 4-formyl phenylboronic acid, phenylboronic acid and derivatives thereof, or compounds such as calcium formate, sodium formate and 1,2-propane diol may be added to further improve stability.

Soap

The detergent compositions herein may comprise from 0% to about 10%, by weight of the surfactant system, of soap. Soaps, also referred to as "fatty acid carboxylates" are formed by the neutralization of fatty acids to form primary carboxylates or soaps having the general formula:

$$RCOO^-M^+$$

wherein R is typically a C9-C21 alkyl group, which may be straight chain or branched chain, and M is a cation. In specific embodiments, R is a C9-C17 alkyl, and more specifically R is C11-C15.

Examples of fatty acids useful herein are selected from the group consisting of lauric acid, tridecylic acid, myristic acid, pentadecylic acid, palmitic acid, margaric acid, stearic acid, arachidic acid, phytanic acid, behenic acid, palmitoleic acid, oleic acid, elaidic acid, vaccenic acid, linoleic acid, cis-eleostearic acid, trans-eleosteric acid, linolenic acid, arachidonic acid and combinations thereof. Fatty acids can be saturated or unsaturated. Unsaturated fatty acids typically having an iodine value from 15 to 25, preferably from 18 to 22 and a cis:trans isomer ratio from 1:1 to 200:1, preferably from 10:1 to 200:1.

Preferred sources of fatty acid are selected from the group consisting of coconut, soybean, tallow, palm, palm kernel, rapeseed, lard, sunflower, corn, safflower, canola, olive, peanut and combinations thereof.

Citrates, e.g., citric acid and soluble salts thereof are important carboxylate builders e.g., for heavy duty liquid detergents, due to availability from renewable resources and biodegradability. Citrates can also be used in granular compositions, especially in combination with zeolite and/or layered silicates. Oxydisuccinates are also especially useful in such compositions and combinations.

Laundry Adjuncts

The detergent compositions herein may include from about 0.01% to about 10.0%, by weight of the composition, of a laundry adjunct. Any conventional laundry detergent ingredients may be used. Examples of laundry adjuncts useful herein include: enzymes, enzymes stabilizers, optical brighteners, particulate material, hydrotropes, perfume and other odor control agents, soil suspending polymers and/or soil release polymers, suds suppressors, fabric care benefits, pH adjusting agents, dye transfer inhibiting agents, preservatives, hueing dyes, non-fabric substantive dyes, encapsulated actives (such as perfume microcapsules or encapsulated bleach), and mixtures thereof.

In one embodiment, the detergent compositions herein comprise perfume microcapsules. In one embodiment, the detergent compositions herein comprise a hueing dye.

Some of these laundry adjuncts are described in greater detail as follows:

Clay Soil Removal/Anti-redeposition Agents—The compositions of the present invention can also optionally contain water-soluble ethoxylated amines having clay soil removal and antiredeposition properties. Granular detergent compositions which contain these compounds typically contain from about 0.01% to about 10.0% by weight of the water-soluble ethoxylated amines; liquid detergent compositions typically contain about 0.01% to about 5%.

A preferred soil release and anti-redeposition agent is ethoxylated tetraethylene pentamine. Exemplary ethoxylated amines are further described in U.S. Pat. No. 4,597,898, VanderMeer, issued Jul. 1, 1986. Another group of preferred clay soil removal-antiredeposition agents are the cationic compounds disclosed in European Patent Application 111,965, Oh and Gosselink, published Jun. 27, 1984. Other clay soil removal/antiredeposition agents which can be used include the ethoxylated amine polymers disclosed in European Patent Application 111,984, Gosselink, published Jun. 27, 1984; the zwitterionic polymers disclosed in European Patent Application 112,592, Gosselink, published Jul. 4, 1984; and the amine oxides disclosed in U.S. Pat. No. 4,548,744, Connor, issued Oct. 22, 1985. Other clay soil removal and/or anti redeposition agents known in the art can also be utilized in the compositions herein. See U.S. Pat. No. 4,891,160, VanderMeer, issued Jan. 2, 1990 and WO 95/32272, published Nov. 30, 1995. Another type of preferred antiredeposition agent includes the carboxy methyl cellulose (CMC) materials. These materials are well known in the art.

Brightener—Any optical brighteners or other brightening or whitening agents known in the art can be incorporated at levels typically from about 0.01% to about 1.2%, by weight, into the detergent compositions herein when they are designed for fabric washing or treatment.

Specific examples of optical brighteners which are useful in the present compositions are those identified in U.S. Pat. No. 4,790,856, issued to Wixon on Dec. 13, 1988. These brighteners include the PHORWHITE series of brighteners from Verona. Other brighteners disclosed in this reference include: Tinopal UNPA, Tinopal CBS and Tinopal 5BM; available from Ciba-Geigy; Arctic White CC and Arctic White CWD, the 2-(4-styryl-phenyl)-2H-naptho[1,2-d]triazoles; 4,4'-bis-(1,2,3-triazol-2-yl)-stilbenes; 4,4'-bis(styryl) bisphenyls; and the aminocoumarins. Specific examples of these brighteners include 4-methyl-7-diethyl-amino coumarin; 1,2-bis(benzimidazol-2-yl)ethylene; 1,3-diphenyl-pyrazolines; 2,5-bis(benzoxazol-2-yl)thiophene; 2-styryl-naptho[1,2-d]oxazole; and 2-(stilben-4-yl)-2H-naphtho[1,2-d]triazole. See also U.S. Pat. No. 3,646,015, issued Feb. 29, 1972 to Hamilton. Liquid laundry detergent compositions of the present disclosure may comprise from about 0.03% to about 0.2%, by weight of the laundry compositions, of an optical brightener.

Dye Transfer Inhibiting Agents—The compositions of the present invention may also include one or more materials effective for inhibiting the transfer of dyes from one fabric to another during the cleaning process. Generally, such dye transfer inhibiting agents include polyvinyl pyrrolidone polymers, polyamine N-oxide polymers, copolymers of N-vinylpyrrolidone and N-vinylimidazole, manganese phthalocyanine, peroxidases, and mixtures thereof. If used, these agents typically comprise from about 0.01% to about 10% by weight of the composition, preferably from about 0.01% to about 5%, and more preferably from about 0.05% to about 2%.

Chelating Agents—The detergent compositions herein may also optionally contain one or chelating agents, particularly chelating agents for adventitious transition metals. Those commonly found in wash water include iron and/or manganese in water-soluble, colloidal or particulate form, and may be associated as oxides or hydroxides, or found in association with soils such as humic substances. Preferred chelants are those which effectively control such transition metals, especially including controlling deposition of such transition-metals or their compounds on fabrics and/or controlling undesired redox reactions in the wash medium and/or at fabric or hard surface interfaces. Such chelating agents include those having low molecular weights as well as polymeric types, typically having at least one, preferably two or more donor heteroatoms such as O or N, capable of co-ordination to a transition-metal, Common chelating agents can be selected from the group consisting of aminocarboxylates, aminophosphonates, polyfunctionally-substituted aromatic chelating agents and mixtures thereof.

If utilized, chelating agents will generally comprise from about 0.001% to about 15% by weight of the detergent compositions herein. More preferably, if utilized, chelating agents will comprise from about 0.01% to about 3.0% by weight of such compositions.

Suds Suppressors—Compounds for reducing or suppressing the formation of suds can be incorporated into the compositions of the present invention when required by the intended use, especially washing of laundry in washing appliances. Other compositions, such as those designed for hand-washing, may desirably be high-sudsing and may omit such ingredients Suds suppression can be of particular importance in the so-called "high concentration cleaning process" as described in U.S. Pat. Nos. 4,489,455 and 4,489,574 and in front-loading European-style washing machines.

A wide variety of materials may be used as suds suppressors and are well known in the art. See, for example, Kirk Othmer Encyclopedia of Chemical Technology, Third Edition, Volume 7, pages 430-447 (Wiley, 1979).

The compositions herein will generally comprise from 0% to about 10% of suds suppressor. When utilized as suds suppressors, monocarboxylic fatty acids, and salts thereof, will be present typically in amounts up to about 5%, preferably 0.5%-3% by weight, of the detergent composition. although higher amounts may be used. Preferably from about 0.01% to about 1% of silicone suds suppressor is used, more preferably from about 0.25% to about 0.5%. These weight percentage values include any silica that may be utilized in combination with polyorganosiloxane, as well as any suds suppressor adjunct materials that may be utilized. Monostearyl phosphate suds suppressors are generally utilized in amounts ranging from about 0.1% to about 2%, by weight, of the composition. Hydrocarbon suds suppressors are typically utilized in amounts ranging from about 0.01% to about 5.0%, although higher levels can be used. The alcohol suds suppressors are typically used at 0.2%-3% by weight of the finished compositions.

Alkoxylated Polycarboxylates—Alkoxylated polycarboxylates such as those prepared from polyacrylates are useful herein to provide additional grease removal performance. Such materials are described in WO 91/08281 and PCT 90/01815 at p. 4 et seq., incorporated herein by reference. Chemically, these materials comprise polyacrylates having one ethoxy side-chain per every 7-8 acrylate units. The side-chains are of the formula —(CH2CH2O)m (CH2)nCH3 wherein m is 2-3 and n is 6-12. The side-chains are ester-linked to the polyacrylate "backbone" to provide a "comb" polymer type structure. The molecular weight can vary, but is typically in the range of about 2000 to about 50,000. Such alkoxylated polycarboxylates can comprise from about 0.05% to about 10%, by weight, of the compositions herein.

Perfumes—Perfumes and perfumery ingredients useful in the present compositions and processes comprise a wide variety of natural and synthetic chemical ingredients, including, but not limited to, aldehydes, ketones, esters, and the like. Also included are various natural extracts and essences which can comprise complex mixtures of ingredients, such as orange oil, lemon oil, rose extract, lavender, musk, patchouli, balsamic essence, sandalwood oil, pine oil, cedar, and the like. Finished perfumes typically comprise from about 0.01% to about 2%, by weight, of the detergent compositions herein, and individual perfumery ingredients can comprise from about 0.0001% to about 90% of a finished perfume composition.

Various detersive ingredients employed in the present compositions optionally can be further stabilized by absorbing said ingredients onto a porous hydrophobic substrate, then coating said substrate with a hydrophobic coating. Preferably, the detersive ingredient is admixed with a surfactant before being absorbed into the porous substrate. In use, the detersive ingredient is released from the substrate into the aqueous washing liquor, where it performs its intended detersive function.

Liquid detergent compositions can contain water and other solvents as carriers. Low molecular weight primary or secondary alcohols exemplified by methanol, ethanol, propanol, and isopropanol are suitable. Monohydric alcohols are preferred for solubilizing surfactant, but polyols such as those containing from 2 to about 6 carbon atoms and from 2 to about 6 hydroxy groups (e.g., 1,3-propanediol, ethylene glycol, glycerine, and 1,2-propanediol) can also be used. The compositions may contain from 5% to 90%, typically 10% to 50% of such carriers.

The detergent compositions herein will preferably be formulated such that, during use in aqueous cleaning operations, the wash water will have a pH of between about 4 and about 11, preferably between about 4.0 and 10.5, more preferably between about 4.0 to about 9.5. Liquid dishwashing product formulations preferably have a pH between about 6.8 and about 9.0. Techniques for controlling pH at recommended usage levels include the use of buffers, alkalis, acids, etc., and are well known to those skilled in the art. Liquid laundry detergent compositions according to the present disclosure can be transparent, translucent, or opaque. The liquid detergent compositions of the present disclosure may further comprises an adjunct ingredient selected from builders, additional brighteners, dye transfer inhibitors, structurants, chelants, polyacrylate polymers, dispersing agents, dyes, perfumes, processing aids, bleaching compounds, solvents, enzymes, microcapsules, beads, soil release polymers, and mixtures thereof.

Laundry Washing Method

Machine laundry methods herein typically comprise treating soiled laundry with an aqueous wash solution in a washing machine having dissolved or dispensed therein an effective amount of a machine laundry detergent composition in accord with the invention. By an effective amount of the detergent composition it is here meant from 40 g to 300 g of product dissolved or dispersed in a wash solution of volume from 5 to 65 litres, as are typical product dosages and wash solution volumes commonly employed in conventional machine laundry methods.

As noted, surfactants are used herein in detergent compositions, preferably in combination with other detersive surfactants, at levels which are effective for achieving at least a directional improvement in cleaning performance. In the context of a fabric laundry composition, such "usage levels" can vary widely, depending not only on the type and severity of the soils and stains, but also on the wash water temperature, the volume of wash water and the type of washing machine.

In a preferred use aspect a dispensing device is employed in the washing method. The dispensing device is charged with the detergent product, and is used to introduce the product directly into the drum of the washing machine before the commencement of the wash cycle. Its volume capacity should be such as to be able to contain sufficient detergent product as would normally be used in the washing method.

Once the washing machine has been loaded with laundry the dispensing device containing the detergent product is placed inside the drum. At the commencement of the wash cycle of the washing machine water is introduced into the drum and the drum periodically rotates. The design of the dispensing device should be such that it permits containment of the dry detergent product but then allows release of this product during the wash cycle in response to its agitation as the drum rotates and also as a result of its contact with the wash water.

Alternatively, the dispensing device may be a flexible container, such as a bag or pouch. The bag may be of fibrous construction coated with a water impermeable protective material so as to retain the contents, such as is disclosed in European published Patent Application No. 0018678. Alternatively it may be formed of a water-insoluble synthetic polymeric material provided with an edge seal or closure designed to rupture in aqueous media as disclosed in European published Patent Application Nos. 0011500, 0011501, 0011502, and 0011968. A convenient form of water frangible closure comprises a water soluble adhesive disposed along and sealing one edge of a pouch formed of a water impermeable polymeric film such as polyethylene or polypropylene.

EXAMPLES

In the following Examples all levels are quoted as % by weight of the composition. The following examples are illustrative of the present invention, but are not meant to limit or otherwise define its scope. All parts, percentages and ratios used herein are expressed as percent weight unless otherwise specified.

A liquid laundry composition comprising:

from about 6% to about 50%, by weight of the laundry composition, of a surfactant component, preferably from about 15% to about 35%, by weight of the laundry composition, of a surfactant component comprising:

a) from about 0.5% to about 30%, by weight of the laundry composition, of an HLAS surfactant selected from alkyl benzene sulfonic acids, alkali metal or amine salts of C10-16 alkyl benzene sulfonic acids, wherein the HLAS surfactant comprises greater than 50% C12, preferably greater than 60%, preferably greater than 70% C12, more preferably greater than 75%, and b) a second surfactant.

The liquid laundry detergent composition according to paragraph A, wherein the surfactant component comprises from about 1% to about 20%, by weight of the laundry composition, of the HLAS surfactant.

The liquid laundry detergent composition according to paragraph A, wherein the surfactant component comprises from about 30% to about 75% by weight of the HLAS surfactant.

The liquid laundry detergent composition according to any of the preceding paragraphs, wherein the ratio of HLAS surfactant to AES surfactant component, on a weight basis, is from about 1:1 to about 10:1.

The liquid laundry detergent composition according to any of the preceding paragraphs, wherein the ratio of HLAS surfactant to AS surfactant component, on a weight basis, is from about 0.5:1 to about 5:1.

The liquid laundry detergent composition according to any of the preceding paragraphs, wherein the laundry composition comprises from about 0.03% to about 0.2%, by weight of the laundry composition, of an optical brightener.

The liquid laundry detergent composition according to any of the preceding paragraphs, wherein the HLAS surfactant is selected from C10 to C14 alkyl benzene sulfonic acids and mixtures thereof.

The liquid laundry detergent composition according to paragraph E, wherein the HLAS surfactant is selected from linear alkyl benzene sulfonates and mixtures thereof.

The liquid laundry detergent composition according to any of the preceding paragraphs, wherein the surfactant component further comprises an additional surfactant selected from anionic surfactants, nonionic surfactants, amphoteric surfactants, amine oxide, other cationic surfactants, and mixtures thereof.

The liquid laundry detergent composition according to any of the preceding paragraphs, wherein the surfactant component comprises from about 0.2% to about 50%, preferably from about 10% to about 50% by weight of nonionic surfactants.

The liquid laundry detergent composition according to any of the preceding paragraphs, wherein the laundry composition has a pH from about 4 to about 9.

The liquid laundry detergent composition according to any of the preceding paragraphs, wherein the laundry composition is transparent or translucent.

The liquid laundry detergent composition according to any of the preceding paragraphs, wherein the laundry composition further comprises a laundry adjunct ingredient selected from builders, additional brighteners, dye transfer inhibitors, structurants, chelants, polyacrylate polymers, dispersing agents, dyes, perfumes, processing aids, bleaching compounds, solvents, enzymes, microcapsules, beads, soil release polymers, and mixtures thereof.

The liquid laundry detergent composition according to any of the preceding paragraphs, wherein the HLAS surfactant comprises a ratio of even carbons to odd carbons of 3:2 to 99:1.

The liquid laundry detergent composition according to any of the preceding paragraphs, wherein the HLAS surfactant is neutralized by any combination of the following counterions: sodium, potassium, magnesium, ammonium, monoisopropanolamine, monoethanolamine, triethanolamine, methyldiethanolamine, dimethylethanolamine.

The aqueous liquid detergent composition of any of the preceding paragraphs, wherein the surfactant system comprises between 2% and 20% by weight of the surfactant system, of nonionic surfactant.

The aqueous liquid detergent composition of any of the preceding paragraphs, wherein the composition comprises between 2% to 10% by weight of an alkyl ethoxylated sulfate surfactant (AES).

The liquid composition of any of the preceding paragraphs, wherein the alkyl portion of the alkyl ethoxylated sulfate surfactant (AES) includes, on average, from 13.9 to about 14.6 carbon atoms distribution.

The liquid laundry detergent composition according to any of the preceding paragraphs, wherein the form is a unitized dose article.

Stain Removal Index Method

Technical stain swatches of CW120 cotton containing bacon grease, cooked beef, burnt butter and grass may be purchased from Accurate Product Development (Fairfield, OH). The swatches can be washed in a Whirlpool® front loader washing machine or in Kenmore® top loader washing machine, using 7 grains per gallon water hardness and washed at 77 degrees Fahrenheit (Whirlpool® front loader washing machine) or 86 degrees Fahrenheit (Kenmore® top loader washing machine). The total amount of liquid detergent used in the test was 49 grams.

Standard colorimetric measurement is used to obtain L*, a* and b* values for each stain before and after the washing. From L*, a* and b* values, the stain level is calculated.

Stain removal from the swatches was measured as follows:

$$(SRI) = \text{Stain Removal Index}\frac{\Delta Einitial - \Delta Ewashed}{\Delta Einitial} \times 100$$

$$\Delta Einitial = \text{Stain level before washing}$$

$$\Delta Ewashed = \text{Stain level after washing}$$

Eight replicates of each stain type should be prepared. The SRI values shown below are the averaged SRI values for each stain type. The stain level of the fabric before the washing (ΔEinitial) is high; in the washing process, stains are removed and the stain level after washing is reduced (ΔEwashed). The better a stain has been removed, the lesser the value for ΔEwashed and the greater the difference between ΔEinitial and ΔEwashed (ΔEinitial–ΔEwashed). Therefore the value of the stain removal index increases with better washing performance.

TABLE 4

SRI data:

| | Example 1 | | Example 2 | | Example 3 | | Example 4 | |
|---|---|---|---|---|---|---|---|---|
| Concentration, ppm | C11.8 HLAS (Comp.) | High C12 HLAS | C11.8 HLAS (Comp.) | High C12 HLAS | C11.8 HLAS (Comp.) | High C12 HLAS | C11.8 HLAS (Comp.) | High C12 HLAS |
| HLAS (ppm) | 50 | 50 | 45 | 45 | 245 | 245 | 338 | 338 |
| AES (ppm) | 53 | 53 | 48 | 48 | 131 | 131 | 183 | 183 |
| NI45-7 (ppm) | 38 | 38 | 36 | 36 | 196 | 196 | 242 | 242 |
| AO (ppm) | 7 | 7 | 6 | 6 | 3 | 3 | 0 | 0 |
| Stain | SRI | SRI | SRI | SRI | SRI | SRI | SRI | SRI |
| Bacon grease | 61.3 | 63.3* | 60.9 | 62.0 | 52.7 | 52.9 | 53.0 | 55.4 |

TABLE 4-continued

| SRI data: | | | | | | | | |
|---|---|---|---|---|---|---|---|---|
| | Example 1 | | Example 2 | | Example 3 | | Example 4 | |
| Concentration, ppm | C11.8 HLAS (Comp.) | High C12 HLAS | C11.8 HLAS (Comp.) | High C12 HLAS | C11.8 HLAS (Comp.) | High C12 HLAS | C11.8 HLAS (Comp.) | High C12 HLAS |
| Burnt butter | 59.5 | 64.4* | 58.4 | 60.8 | 52.7 | 58.6* | 60.5 | 64.2 |
| Cooked beef | 54.2 | 59.7* | 52.7 | 56.0* | 38.9 | 42.6 | 43.4 | 47.4 |
| Grass | 65.0 | 65.1 | 63.7 | 64.5 | 69.2 | 70.7* | 72.3* | 73.9 |

*Significant vs. Current HLAS Control at 95% Confidence Interval

As shown above, the high C12 LAS showed better stain removal for bacon grease, burnt butter, and cooked beef versus an identical formula made with the comparative C11.8 HLAS. A similar effect is shown when comparing a high C12 LAS versus other current comparative non-high C12 formulations for at least cooked beef, burnt butter, and grass.

A surprising trend has been found wherein the use of C12 HLAS improves Freshness scores with increasing levels of C12. This is demonstrated below.

Fabric Headspace Analysis

Fabrics were stripped using 2 wash and rinse cycles using 48 g AATCC detergent in 140° F. and soft water and 2 wash and rinse cycles without product in 140° F. soft water. Preconditioned fabrics were generated using 3 detergent/LFE cycles using 85 g nil-perfume/perfume encapsulate detergent and 48.5 g liquid nil-perfume/perfume encapsulate fabric enhancer. Each cycle is run with 7 gpg water in 90° F. wash/60° F. rinse.

Tergotometer pots (1.0 L) containing 2.6 grams of the detergent, test fabrics (1.4 cm terry dots), ballast at 70° F. and 7 US gpg hardness water were agitated at 700 rpm for 2 mins. After the wash, the test fabrics and ballast were then rinsed in fresh water (7 US gpg hardness at 70° F.) for 10 minutes. The test fabrics were dried at 145° F. for 30 minutes.

Fabric headspace analysis is performed using Solid-phase Micro Extraction Gas Chromatography Mass Spectrometry (SPME GC-MS) described below. Typically, greater perfume intensity (as measured by headspace analysis) correlates with higher concentrations of perfume on fabric. Perfume headspace analysis is carried out on treated 100% cotton terry towels that have been prepared and treated according to the fabric preparation method that is described above. Headspace analysis is done on six treated fabrics from two different wash cycles for a total of twelve fabrics. Each treated fabric is die-cut into ten 1.4 cm-diameter circle test specimens using a pneumatic press (Atom Clicker Press SE2OC available from Manufacturing Suppliers Services, Cincinnati, Ohio). The ten test specimens are placed into a 20 mL headspace sample vial (#24694, available from Restek, Bellefonte, Pa.), the weight is recorded (ten 1.4 cm circles weigh about 0.70 g±0.07 g), and the vial is capped (#093640-094-00 available from Gerstel, Linthicum, Md.).

Prior to the headspace analysis, each sample is preconditioned in the machine at 65° C. for 10 minutes. Headspace is extracted onto an Agilent 7890B/5977A GC-MS system (Agilent Technologies, Santa Clara, Calif, USA) equipped with a Supelco 50/30 micrometer DVB/CAR-IPDMS 23Ga. Solid Phase Micro Extraction fiber (Supelco Inc., Bellefonte, Pa., USA). GC analysis is conducted on a non-polar capillary column (DB-5M5 UI, 30 meters nominal diameter, 0.25 millimeter nominal diameter, 25 micrometer thickness) and the headspace constituents (i.e. the perfume raw materials) are monitored by Mass Spectrometry (El, 70 eV detector). Headspace intensity is calculated utilizing a single point calibration of the perfume raw materials. The total headspace concentration for each vial is calculated from the sum of the concentration of each detected perfume raw material, and the headspace is averaged for the twelve treated fabrics. Headspace improvement may be determined relative to the reference treatment. All treatments had the same composition except for the HLAS specification. A variety of HLAS specifications were created by blending the High C12 HLAS and the C11.8 (Comparative 27%, C12 HLAS) at different ratios. Fabrics were washed in the different detergent treatment with the headspace intensity results shown below. The use of an increasing proportion of C12 HLAS increases Dry Fabric Odor (DFO) intensity on stripped and pre-conditioned fabrics.

| Level (% active) | 96% C12 HLAS (A) | 83.0% C12 HLAS (B) | 71.2% C12 HLAS (C) | 59.4% C12 HLAS (D) | 47.6% C12 HLAS (E) | Comp. 27% C12 HLAS (F) |
|---|---|---|---|---|---|---|
| HLAS | | | | 9.7 | | |
| ABS | | | | 5.2 | | |
| NI45-7 | | | | 7.2 | | |
| AO | | | | 0.1 | | |
| Stripped Fabric DFO, nMol/L | 1.48 CDEF | 1.43 DEF | 1.27 DEF | 1.10 EF | 0.97 EF | 0.85 |
| Pre-conditioned Fabric, DFO nMol/L | 1.32 DEF | 1.31 DEF | 1.21 EF | 1.08 F | 1.01 F | 0.70 |

If two treatment do not share a letter, they are statistically significant at 95% confidence interval.

Viscosity

As shown in the table below, surprisingly, the viscosity increased when using the high C12 HLAS of the present invention vs. comparative C11.8 HLAS at the same level of surfactant in each formulation. Two versions of each detergent composition are prepared—one with comparative Cl1.8 HLAS and one with high C12 HLAS of the present invention. The initial viscosities of each composition are measured using a Brookfield viscometer, No. 2 spindle, at 60 RPM/s, at 25° C.

| | Example | | | | | | |
|---|---|---|---|---|---|---|---|
| Active (%) | 1 | 2 | 3 | 4 | 5 | 6 | 7 |
| HLAS | 2.9 | 2.4 | 11.7 | 6.8 | 7.7 | 2.8 | 2.0 |
| AES | 12.0 | 8.4 | 18.9 | 10.4 | 11.6 | 18.1 | 12.9 |

-continued

| | Example | | | | | | |
|---|---|---|---|---|---|---|---|
| Active (%) | 1 | 2 | 3 | 4 | 5 | 6 | 7 |
| NI45-7 | 0 | 0 | 0 | 4.9 | 0 | 5.74 | 4.1 |
| AO | 0 | 0.6 | 0 | 0.7 | 0 | 0 | 0 |
| Viscosity, cP, 25C C11.8 HLAS | 587 | 729 | 747 | 715 | 635 | 1660 | 640 |
| Viscosity, cP, 25C High C12 HLAS | 1619 | 1850 | 816 | 757 | 763 | 1802 | 789 |

Surprisingly, it has been found that the high C12 HLAS can also serve as a rheology modifier. As shown in the table above, the formulations with high C12 exhibit an increased viscosity thereby allowing for a reduction of rheology modifiers in the formulation while still achieving the desirable viscosity targets for the formulation. This unexpected result allows for increased levels of performance components in the composition while reducing costs.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm" whether or not the term 'about' is expressly recited. Every range disclosed herein includes all endpoints of that range whether disclosed within that range or as part of a related range. Thus two endpoints of the same range may be disclosed as endpoints of broader or narrower ranges. The common mathematical symbols > and < mean greater than or equal to and less than or equal to, respectively, and include the endpoints set forth in the equations and inequalities below.

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A liquid laundry detergent composition comprising:

from about 6% to about 50%, by weight of the laundry composition, of a surfactant component, comprising; a) from about 0.5% to about 30%, by weight of the laundry composition, of an alkyl benzene sulfonate surfactant comprising alkyl benzene sulfonic acids, alkali metal or amine salts of C10-16 alkyl benzene sulfonic acids, or a combination thereof, wherein the alkyl benzene sulfonate surfactant comprises greater than 70% C12, and b) a second surfactant comprising an alkyl ethoxylated sulfate and additionally an alcohol ethoxylate, an amine oxide, or a combination thereof.

2. The liquid laundry detergent composition of claim 1, wherein the ratio of even carbons to odd carbons is about 3:2 or more.

3. The liquid laundry detergent composition according to claim 2, wherein the surfactant component comprises from about 1% to about 20%, by weight of the laundry composition, of the alkyl benzene sulfonate surfactant.

4. The liquid laundry detergent composition according to claim 2, wherein the surfactant component comprises from about 30% to about 75% by weight of the alkyl benzene sulfonate surfactant.

5. The liquid laundry detergent composition according to claim 2, wherein the ratio by weight of the alkyl benzene sulfonate surfactant to the alkyl ethoxylated sulfate surfactant, is from about 1:1 to about 10:1.

6. The liquid laundry detergent composition according to claim 2, wherein the ratio by weight of the alkyl benzene sulfonate surfactant to the alkyl sulfate surfactant is from about 0.5:1 to about 5:1.

7. The liquid laundry detergent composition according to claim 1, wherein the alkyl benzene sulfonate surfactant comprises a C10 to C14 alkyl benzene sulfonic acids or a mixture thereof.

8. The liquid laundry detergent composition according to claim 7, wherein the alkyl benzene sulfonate surfactant comprises a linear alkyl benzene sulfonate or a mixture thereof.

9. The liquid laundry detergent composition according to claim 2, wherein the alkyl benzene sulfonate surfactant comprises greater than 75% C12.

10. The liquid laundry detergent composition according to claim 1, wherein the surfactant component comprises from about 0.2% to about 50% by weight of nonionic surfactants.

11. The liquid laundry detergent composition according to claim 2, wherein the laundry composition has a pH from about 4 to about 9.

12. The liquid laundry detergent composition according to claim 2, wherein the laundry composition is transparent or translucent.

13. The liquid laundry detergent composition according to claim 1, wherein the alkyl benzene sulfonate surfactant comprises a ratio of even carbons to odd carbons of 3:2 to 99:1.

14. The liquid laundry detergent composition according to claim 2, wherein the alkyl benzene sulfonate surfactant is neutralized by any one or more of the following counterions: sodium, potassium, magnesium, ammonium, monoisopropanolamine, monoethanolamine, triethanolamine, methyldiethanolamine, and dimethylethanolamine.

15. The liquid laundry detergent composition of claim 2, wherein the second surfactant comprises a combination of an alcohol ethoxylate and an alkyl ethoxylated sulfate.

16. The liquid laundry detergent composition of claim 15, wherein the composition comprises from about 2% to 10% by weight of the alkyl ethoxylated sulfate.

17. The liquid laundry composition of claim 16, wherein the alkyl portion of the alkyl ethoxylated sulfate includes, on average, from 13.9 to about 14.6 carbon atoms distribution.

18. The liquid laundry detergent composition of claim 15, wherein the alcohol ethoxylate comprises a C12-C14 EO7, a C12-C14 EO9, a C14-C15 EO7, a C12-C15 EO7, or a combination thereof.

19. The liquid laundry detergent composition of claim 2, wherein the liquid laundry detergent composition is a unitized dose article.

* * * * *